United States Patent

[11] 3,612,990

| [72] | Inventor | Anthony Del Duca<br>Santa Barbara, Calif. |
| --- | --- | --- |
| [21] | Appl. No. | 869,235 |
| [22] | Filed | Oct. 24, 1969 |
| [45] | Patented | Oct. 12, 1971 |
| [73] | Assignee | Beckman Instruments, Inc. |

[54] PARAMAGNETIC GAS SENSOR EMPLOYING AC POSITION SENSING AND ELECTROSTATIC DC NULL BALANCING
8 Claims, 5 Drawing Figs.

[52] U.S. Cl. .................................................. 324/36, 324/109
[51] Int. Cl. ...................................................... G01r 33/12, G01r 29/22
[50] Field of Search ......................................... 324/36, 109, 125; 73/23, 27.5

[56] References Cited
UNITED STATES PATENTS

| 3,487,297 | 12/1969 | Guyton ........................ | 324/36 |
| --- | --- | --- | --- |
| 2,353,618 | 7/1944 | Lamb ........................... | 324/125 |
| 3,026,472 | 3/1962 | Greene et al. ................ | 324/36 |
| 3,302,448 | 2/1967 | Mocker ........................ | 73/23 |

FOREIGN PATENTS

| 202,317 | 5/1966 | U.S.S.R. ...................... | 324/125 |
| --- | --- | --- | --- |

*Primary Examiner*—Alfred E. Smith
*Attorneys*—Thomas L. Peterson and Robert J. Steinmeyer ABSTRACT: Apparatus for determining the partial pressure of a paramagnetic gas in a gas mixture wherein a pivotally mounted test body, in the form of two hollow spheres in a dumbbell configuration, is supported in an inhomogeneous magnetic field, the test body being deflected from a null position when the paramagnetic gas is present and being restored to the null position by an electrostatic force, the magnitude of the restoring force being a function of the partial pressure of the paramagnetic gas, the improvement wherein mechanical constraints are provided to prevent excessive rotation or linear deflection of the test body. The mechanical constraint consists of at least two, and preferably four, electrostatic pole pieces positioned very close to the dumbbells on opposite sides thereof for limiting the deflection of the test body. In addition, the four pole pieces may be electrically cross-connected to form a capacitance bridge whereby deflection of the test body from its null position unbalances the bridge providing an output signal which may be fed back to the pole pieces to restore the test body to the null position.

PATENTED OCT 12 1971

3,612,990

PRIOR ART

INVENTOR.
ANTHONY DEL DUCA

BY Thomas L. Peterson

ATTORNEY

PARAMAGNETIC GAS SENSOR EMPLOYING AC POSITION SENSING AND ELECTROSTATIC DC NULL BALANCING

BACKGROUND OF THE INVENTION

1. Field of the Invention

The present invention relates generally to an instrument for measuring the quantity of a particular gas present in a gas mixture and, more particularly to an improved null-type paramagnetic oxygen sensor which prevents excessive rotation or linear deflection of the test body.

2. Description of the Prior Art

Apparatus for measuring the partial pressure of a paramagnetic gas, such as oxygen, in a mixture of gases is old and well known. One type of apparatus, and the type to which the present invention relates, is disclosed in U.S. Pat. No. 2,416,344 issued on Feb. 25, 1947 to Linus Pauling. Such apparatus is based on the principal that the force acting on a test body in an inhomogeneous magnetic field is dependent on the magnetic susceptibility of the gas surrounding the test body. Since oxygen alone of the common environmental gases is highly paramagnetic while all other components are very slightly diamagnetic, a measurement of the force generated by a mixture of gases provides a measurement of the partial pressure of oxygen in the gas mixture with very little error or need for correction because of the presence of the other gases.

Apparatus of the type described in U.S. Pat. No. 2,416,344 utilizes a test body in the form of two hollow spheres in a dumbbell configuration freely suspended on a quartz fiber. The small glass dumbbells are filled with gas, sealed and placed in an inhomogeneous magnetic field which is established, for example, by wedge-shaped pole pieces. The force exerted on the test body is a function of the difference between the magnetic susceptibility per unit volume of the test body and the magnetic susceptibility per unit volume of the gas surrounding the test body per unit pressure. Accordingly, if the gas surrounding the test body changes in magnetic susceptibility, a torque will be exerted on the dumbbells causing a n angular deflection thereof. In a simple instrument, the magnetic torque is balanced by the suspension fiber torque and equilibrium is reached when the opposing torques are equal, making the angle of rotation of the dumbbells a direct function of the volume magnetic susceptibility of the medium surrounding the test body.

In the apparatus described in U.S. Pat. No. 2,416,344 the quartz fiber carries a mirror such that the displacement of the fiber-supported test body from its equilibrium position, corresponding to changes in the composition of the gas surrounding the test body, may be measured by a scale which is positioned in the path of a light spot reflected from the mirror. Other systems have used photosensitive devices for receiving the reflected light spot, which photosensitive devices are capable of providing an electrical output signal which may be further processed and/or transmitted to a remote location.

Whether of not such photosensitive devices are utilized, a problem associated with such simple instruments is that the angle of rotation of the test body is nonlinear for large angles of rotation. To solve this problem, the magnetic torque may be balanced by an electrostatic torque to provide an electrical output. In this method, deviation of the test body from a null position produces an error signal which is amplified and applied to one or more electrodes or vanes positioned adjacent the test body. The electrostatic torque caused by the voltage on the electrodes returns the test body to the null position. The output representing the oxygen concentration, is then the feedback voltage to the electrodes that is necessary to return the test body to the null position. A system which utilizes the combination of optical sensing of the test body position with electrostatic null balancing is described in U.S. Pat. No. 3,026,472 issued Mar. 20, 1962 to M. W. Greene et al. An additional system which utilizes AC position sensing combined with electrostatic DC null-balancing to provide a highly stable and linear electrical output indicative of the partial pressure of oxygen in a mixture of gases is described and claimed in U.S. Pat. application Serial No. 869,237 filed concurrently herewith by M. W. Greene for Paramagnetic gas Sensor and assigned to Beckman Instruments, Inc., the assignee of the present invention.

A weak point in all of the sensors described above, including those of the M. W. Greene et al. patent and the M. W. Greene application, lies in the delicate nature of the fiber and dumbell assembly. More specifically, under conditions where the mechanism may be subjected to shock and vibration, an excessive rotation or linear deflection may occur, resulting in breakage of the fiber. In addition, with the electrostatic vanes positioned as shown in the beforementioned patent to Greene et al. and the beforementioned application of Greene, a sudden rotation of the sensor could cause the dumbbells to swing by an amount which would remove them from the influence of the restoring electrostatic torque caused by voltages on the vanes. In fact, in a closed loop system, the feedback could become regenerative which would lock the system in an extreme position.

SUMMARY OF THE INVENTION

According to the present invention, there is provided a paramagnetic oxygen sensor which substantially overcomes these problems of the prior art. The present paramagnetic oxygen sensor utilizes apparatus of the type disclosed in U.S. Pat. No. 2,416,344 to derive a measurement of the magnetic susceptibility of a mixture of gases. However, the present sensor provides a technique for substantially improving the ruggedness of the dumbbell assembly by preventing excessive rotation or linear deflection of the test body. In addition, the present invention combines such ruggedness with AC position sensing and electrostatic DC null balancing to sense test body deviation from the null position and to provide an electrical output indicative of the partial pressure of oxygen in a mixture of gases.

Briefly, the present paramagnetic oxygen sensor incorporates four insulated, capacitive, pole pieces which are positioned very close to the test body dumbbells on opposite sides thereof so that an insignificant velocity difference between the dumbbells and the pole pieces is possible. Due to the small spacing between the dumbbells and the pole pieces, it is essentially impossible to accelerate the dumbbells to a value where their velocity relative to the pole pieces would be great enough to cause damage to the dumbbells or the suspension. The proposed system would also recover much faster from a transient deflection due to the limited maximum deflection obtainable. In addition, the four pole pieces may be electrically cross-connected to form a capacitance bridge to sense dumbbell deviation from the neutral position to provide a feedback signal which is indicative of the partial pressure of oxygen in the mixture of gases surrounding the test body.

It is therefore an object of the present invention to provide an improved paramagnetic gas sensor.

It is a further object of the present invention to provide a paramagnetic oxygen sensor of the type which utilizes a test body in the form of two hollow spheres in a dumbbell configuration which prohibits excessive rotation or linear deflection of the dumbbell assembly.

It is a still further object of the present invention to improve the ruggedness of the dumbbell assembly of a paramagnetic oxygen sensor and at the same time to provide an improved capacitance sensing device.

It is another object of the present invention to provide a paramagnetic oxygen sensor which combines AC position sensing and DC null balancing to provide an electrical output indicative of the partial pressure of oxygen or other paramagnetic gases in a mixture of gases.

Still other objects, features and attendant advantages of the present invention will become apparent to those skilled in the art from a reading of the following detailed description of the preferred embodiment constructed in accordance therewith,

DESCRIPTION OF THE PREFERRED EMBODIMENT

Figure 1:
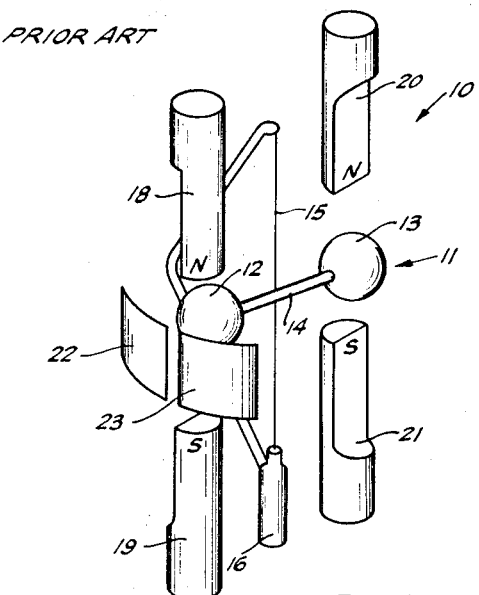
FIG. 1 is a diagrammatic representation of a prior art paramagnetic oxygen sensor.
Figure 2:
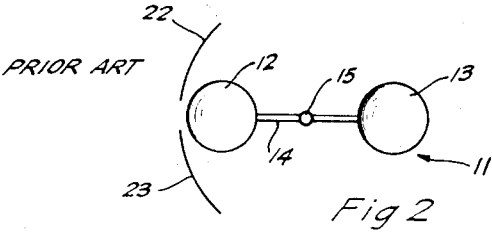
FIG. 2 is an enlarged top view of the dumbbells and electrostatic vanes of the sensor of FIG. 1.

THe present paramagnetic oxygen sensor utilizes the same principal as that of the sensor described in the beforementioned U.S. Pat. No. 2,416,344. Accordingly, the construction and operation of the mechanical components of the present sensor will not be described in detail. Furthermore, the present sensor represents an improvement over the sensor disclosed in the beforementioned U.S. Pat. No. 3,026,472 to Greene et al. and the beforementioned copending application of Greene. With reference to FIGS. 1 and 2 of the present drawings, that patent and that patent application disclose a sensor, generally designated 10, which includes a test body 11 in the form of two small, hollow, glass spheres 12 and 13 carried at the end of a rod 14, in a dumbbell configuration, which is suspended from a quartz fiber 15 strung upon a quartz bow 16. Magnetic pole pieces 18, 29, 20 and 21 are mounted above and below spheres 12 and 13, respectively to produce an inhomogeneous magnetic field in which spheres 12 and 13 move. In addition, sensor 10 includes a pair of electrostatic vanes 22 and 23 which are geometrically positioned in close proximity to test body sphere 12. By applying a DC voltage to test body 11 and vanes 22 and 23, an electrostatic torque is produced which may be used to maintain test body 111 in a null position. In addition, and described and claimed in the beforementioned patent application to Greene, such vanes may be used to sense displacement of test body 11 from its null position.

As shown in FIGS. 1 and 2, vanes 22 and 23 are arcuate in shape with the center of curvature of vanes 22 and 23 aligned with the axis of rotation of test body 11. In this manner, sphere 12 remains spaced by a fixed amount relative to either vane 22 or 23 as it moves in an arcuate path around fiber 15.

A weak point in this mechanism lies in the delicate nature of fiber 15 and test body 11. If sensor 10 is subjected to a shock or vibration, there is no provision for mechanical constraint of test body 11. As a result, excessive rotation or linear deflection of test body 11 may occur resulting in breakage of fiber 15. In addition, with the configuration shown in FIGS. 1 and 2, a sudden rotation of sensor 10 could cause test body 11 to swing so far that dumbbells 12 and 13 would not be under the influence of a restoring electrostatic torque. In fact, in a closed loop system, the feedback could become regenerative which would lock test body 11 in an extreme position.

Figure 3:
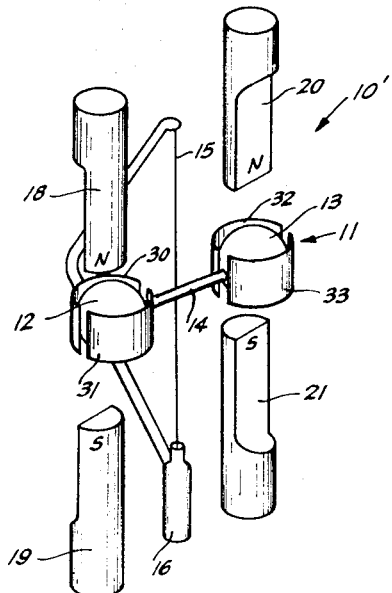
FIG. 3 is a diagrammatic representation of the present paramagnetic oxygen sensor.
Figure 4:
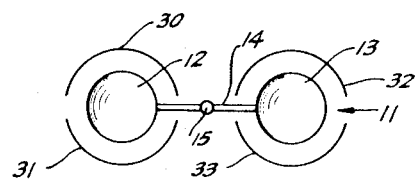
FIG. 4 is an enlarged top view of the dumbbells and electrostatic pole pieces of the sensor of FIG. 3.

Referring now to FIGS. 3 and 4, the present paramagnetic oxygen sensor, generally designated 10' is similar to sensor 10 in that there is included test body 11 suspended from a quartz fiber 15 strung upon a quartz bow 16, and magnetic pole pieces 18, 19, 20 and 21 mounted above and below spheres 12 and 13, respectively, to produce an inhomogeneous magnetic field in which spheres 12 and 13 move. However, in sensor 10', electrostatic to vanes 22 and 23 are replaced by at least two, and preferably four, insulated pole pieces 30, 31, 32 and 33 which are arranged in pairs, the pole pieces of each pair being positioned on opposite sides of dumbbells 12 and 13, respectively, in the path of motion thereof. Pole pieces 30 and 31, comprising one pair, are arcuate and have the same center of curvature as sphere 12. Similarly, pole pieces 32 and 33, comprising a second pair, are arcuate and have the same center of curvature as sphere 13. Pole pieces 30 and 31 are equally spaced on opposite sides of sphere 12 whereas pole pieces 32 and 33 are equally spaced on opposite sides of sphere 13. With pole pieces 30–33 positioned very close to spheres 12 and 13, an insignificant velocity difference between test body 11 and pole pieces 30–33 is possible. It would be almost impossible to accelerate either test body 11 or pole pieces 30–33 o a value where the pole piece velocity relative to that of test body 11 would be great enough to cause damage to test body 11 or suspension 16.

Figure 5:
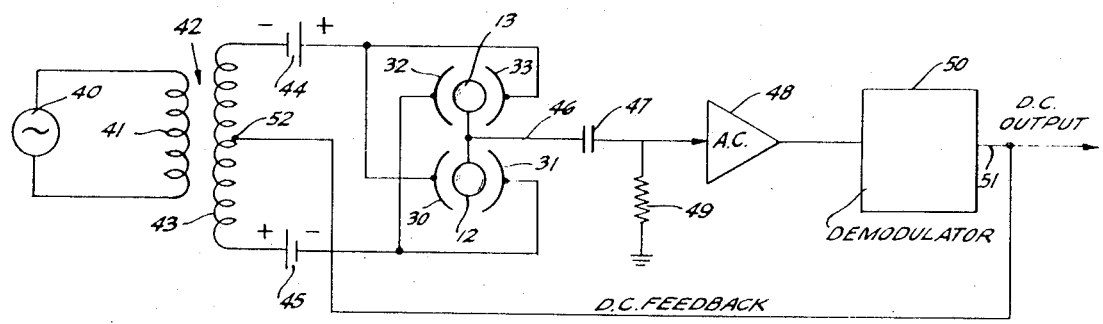
FIG. 5 is a circuit diagram showing the manner in which the pole pieces of FIGS. 3 and 4 may be electrically cross-connected to form a capacitance bridge.

Pole pieces 30–33, which may, conveniently, be made of anodized aluminum, serve as insulated capacitive plates, which may, in conjunction with spheres 12 and 13, be utilized for electrostatic null balancing as in the beforementioned patent to Greene et al. Alternatively, and as shown in FIG. 5 hereof, pole pieces 30–33 may be electrically cross-connected to form a capacitance bridge wherein deviation of test body 11 from the null position unbalances the bridge producing an output signal which may be fed back to the pole pieces to restore test body 11 to its null position. More specifically, the embodiment of FIG. 5 consists of an AC carrier source 40 connected to the primary 41 of a transformer 42 having a secondary 43. One end of secondary 43 is connected to the negative terminal of a DC power source 44, the positive terminal of which is connected to pole pieces 30 and 33. The other end of secondary 43 of transformer 42 is connected to the positive terminal of a DC power source 45, the negative to the positive terminal of a DC power source 45, the negative terminal of which is connected to pole pieces 31 and 32. The electrical potential of test body 11 is conducted via support 16, a line 46, and a coupling capacitor 47 to the input of an AC amplifier 48, which input may be shunted to ground by a resistor 49. The output of amplifier 48 is demodulated by a demodulator 50 to provide, on a line 51, a DC output and a DC feedback voltage which is fed back to the center tap 52 of secondary 43 of transformer 42.

In operation, pole pieces 30 and 31 in conjunction with sphere 12, and pole pieces 32 and 33 in conjunction with sphere 13, form the four capacitive elements of a capacitance bridge. The bridge is energized by AC source 40 and the output of the bridge appears on test body 11. The bridge is balanced when the capacitance between pole pieces 30 and 31 and sphere 12 and pole pieces 32 and 33 and sphere 13 are all equal. As test body 11 rotates due to variations in magnetic torque, the relative capacitance between the pole pieces and test body 11 are altered. Thus, the AC bridge output potential is applied to the input of AC amplifier 48 which provides an AC output proportional to the displacement of test body 11 from its null position. This AC signal is demodulated by demodulator 50 to provide a DC signal which is fed back to secondary 43 of transformer 42 thus shifting the DC operating level of pole pieces 30–33. The net effect is to raise or lower the DC potential of pole pieces 30–33 with respect to test body 11 thereby generating an electrostatic torque to return test body 11 to its null position.

Therefore, it can be seen that in accordance with the present invention, there is provided a paramagnetic oxygen sensor which overcomes a weakness inherent in prior art oxygen sensors of the type disclosed in U.S. Pat. No. 2,416,344. More specifically, the present sensor eliminates the possibility of damage to the delicate fiber or dumbbell assembly in such sensors which may occur because of excessive rotation or linear deflection of the test body. In addition, the present invention combines this ruggedness with AC position sensing and electrostatic DC null balancing to sense test body deviation from the null position and to provide an electrical output indicative of the partial pressure of oxygen in a mixture of gases.

While the invention has been described with respect to a preferred physical embodiment constructed in accordance therewith, it will be apparent to those skilled in the art that modifications and improvements may be made without departing from the scope and spirit of the invention. More specifically, it should be noted that the present invention is not limited to paramagnetic oxygen sensors but may be used with other null-type gas sensors. For example, the invention may be used as a gas density analyzer. The manner in which the present paramagnetic oxygen sensor may be converted to a density sensor is described more fully in the before mentioned U.S. Pat. No. 3,026,472.

I claim:

1. In an instrument for measuring the quantity of a particular gas present in a gas mixture wherein a pivotally mounted test body in the form of two interconnected spheres in a dumbbell configuration is deflected form a null position when the particular gas is present and is restored to the null position by an electrostatic force, the magnitude of the restoring force being a function of the quantity of the particular gas present, the improvement comprising:

first and second insulated, electrostatic pole pieces positioned on opposite sides of one of said spheres of said test body in the path of movement thereof for limiting the deflection of said test body; and circuit means cooperating with said pole pieces and said test body and responsive to deflection of said test body from said null position for applying a signal to said pole pieces to restore said test body to said null position.

2. In an instrument according to claim 1, the improvement wherein said first and second pole pieces are arcuate and have the same center of curvature as said one of said spheres.

3. In an instrument according to claim 1, the improvement comprising:

third and fourth insulated, electrostatic pole pieces positioned on opposite sides of the other of said spheres in the path of movement thereof.

4. In an instrument according to claim 3, the improvement wherein said first, second, third and fourth pole pieces are arcuate, wherein said first and second pole pieces have the same center of curvature as said one of said spheres, and wherein said third and fourth pole pieces have the same center of curvature as said other of said spheres.

5. In an instrument according to claim 3, the improvement wherein said circuit means comprises:

a capacitance bridge, said first and second pole pieces in conjunction with said one of said spheres and said third and fourth pole pieces in conjunction with said other of said spheres comprising the four capacitive elements of said bridge, said bridge being operative, in response to deflection of said test body from said null position, to generate an AC signal indicative of the quantity of said particular gas.

6. In an instrument according to claim 5, the improvement wherein said circuit means further comprises:

means for demodulating said AC signal to provide a DC signal indicative of the quantity of said particular gas; and feedback means for applying said DC signal to said pole pieces to return said test body to said null position 7. In an instrument according to claim 5, the improvement wherein said circuit means further comprises:

AC and DC power supply means having first and second output terminals, said first output terminal being connected to said first and said fourth pole pieces, and said second output terminal being connected to said second and said third pole pieces.

8. In an instrument according to claim 1, the improvement wherein said circuit means comprises:

a capacitance bridge, said test body and said pole pieces comprising capacitive elements of said bridge, said bridge being operative, in response to deflection of said test body from said null position, to generate an AC signal indicative of the quantity of said particular gas present in said gas mixture;

means for demodulating said AC signal to provide a DC signal indicative of the quantity of said particular gas; and feedback means for applying said DC signal to said pole pieces to return said test body to said null position.